(12) United States Patent
Bjorke et al.

(10) Patent No.: US 11,961,158 B2
(45) Date of Patent: Apr. 16, 2024

(54) LIFT SYSTEMS

(71) Applicants: Jacob Robert Bjorke, Mankato, MN (US); Daniel Elia Chahla, Saint Paul, MN (US)

(72) Inventors: Jacob Robert Bjorke, Mankato, MN (US); Daniel Elia Chahla, Saint Paul, MN (US)

(73) Assignee: IOTA, LLC, Mankato, MN (US)

(*) Notice: Subject to any disclaimer, the term of this patent is extended or adjusted under 35 U.S.C. 154(b) by 734 days.

(21) Appl. No.: 15/872,862

(22) Filed: Jan. 16, 2018

(65) Prior Publication Data
US 2020/0394742 A1 Dec. 17, 2020

Related U.S. Application Data

(60) Provisional application No. 62/446,831, filed on Jan. 16, 2017.

(51) Int. Cl.
| | |
|---|---|
| *G06Q 50/28* | (2012.01) |
| *G06F 16/23* | (2019.01) |
| *G06K 19/06* | (2006.01) |
| *G06K 19/07* | (2006.01) |
| *G06Q 20/20* | (2012.01) |
| *G06Q 30/00* | (2012.01) |
| *G06Q 30/018* | (2023.01) |

(52) U.S. Cl.
CPC ......... *G06Q 50/28* (2013.01); *G06F 16/2379* (2019.01); *G06K 19/06028* (2013.01); *G06K 19/0723* (2013.01); *G06Q 20/203* (2013.01); *G06Q 30/0185* (2013.01)

(58) Field of Classification Search
CPC .. G06Q 50/28; G06Q 20/203; G06Q 30/0185; G06F 16/237; G06K 19/06028; G06K 19/0723
See application file for complete search history.

(56) References Cited

U.S. PATENT DOCUMENTS

| | | | |
|---|---|---|---|
| 2007/0067203 A1* | 3/2007 | Gil | G06Q 30/0203 705/7.29 |
| 2012/0094597 A1* | 4/2012 | Tysowski | G06Q 10/10 455/41.1 |
| 2012/0226586 A1* | 9/2012 | Paul | G06Q 30/06 705/26.61 |
| 2016/0197772 A1* | 7/2016 | Britt | G08C 17/02 370/254 |

\* cited by examiner

*Primary Examiner* — Paul Danneman
(74) *Attorney, Agent, or Firm* — Harness, Dickey & Pierce, P.L.C.; Anthony G. Fussner

(57) ABSTRACT

The present invention provides a system for retailers to monitor and track customer interaction with a product in a retail environment. The system of the present invention utilizes RFID tagged products and communicating with near field communication in an Internet of Things environment for a more comprehensive relationship between customers and the products of interest. Where the products are not so connected, the system of the present invention alerts the need for same.

14 Claims, 2 Drawing Sheets

LIFT SYSTEMS

PRIOR APPLICATION

This application claims the benefit of U.S. Provisional Application No. 62/446,831, entitled "Lift Systems" filed Jan. 16, 2017 which is hereby incorporated by reference.

BACKGROUND

Customer shopping behaviors and engagement in a store or shopping environment have been the subject of interest to most store operators or businesses. In most instances, store operators are in the dark about how customers and potential customers behave or interact with products of interest on store shelves and the subsequent placements, replacements or lack thereof. It is reasonable to expect potential customers to pick up the products they are about to purchase or evaluate. What is lost is the lack of ability to discern whether a product was picked up or not by a potential customer or if the customer had any engagement with the product at the location of interest. In some instances, the picked up product may be returned to a different location of the store or shop.

Most products do not have tags that may be used to follow the movements of the products once they are placed on the shelves. When and where tags are used, the purpose remains monitoring and preventing theft of those products. While this is valuable, the connectivity and link with the product and the store seem limited to the theft prevention system where for the most part, a message will be sent if there is unauthorized taking of the product or pilferage.

There is an increasing need to learn how customers interact with the products on the shelves and practically what products are lifted or not at all in the life cycle of products in a store. Up till now, the best approach to this information would be to carry out surveillances or monitoring of some sort that may become an annoyance to customers who may prefer to maintain their privacies, even if in a store environment.

From the foregoing and more, it will be appreciated that what is needed in the art is a system that allows the store operator or management to learn about the interaction between the customer and a product of interest in the store environment prior to, or as they make the purchase decision. Such system is disclosed and claimed herein.

SUMMARY

In one embodiment, the present invention provides a system for tracking the interaction between a customer and a product in a location of interest. Such interaction may include if the product is picked up or returned to the original location or left in a secondary location away from where it was first taken.

In another embodiment of the present invention, the system provides a means to monitor the movement of the product that may include an expanded solution to product theft and control against such pilfering.

DETAILED DESCRIPTION

Figure 1:
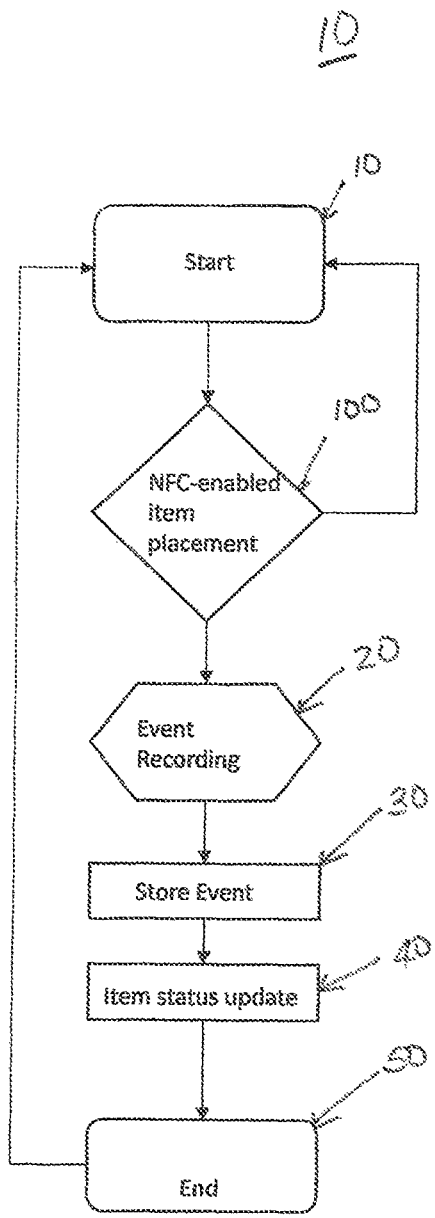
FIG. 1 illustrates a flow process for monitoring the interaction of a product according to the present invention.

In an embodiment of the present invention, a system is established to monitor and record the interaction of customers and related users in a retail environment or in a location of choice wherein the need to monitor inventory or stock is desirable. An initial condition of the system of the present invention is preferably built to recognize the products that are either in inventory or used for any intended outcomes allowable under the present invention. Such recognition may include a database of the inventory located either in the store inventory system, a server notwithstanding the situs of the server, or in the Cloud wherein access to the data can be made from any relevant control points set by retailers or their agents. A product of interest is preferably tagged with an identifier prior to placement on the shelves, racks or other suitable accessible point in the retail environment.

Although reference herein is made to a retail environment, the system of the present invention may be utilized in any environment of choice that includes the monitoring of material or merchandise, whether that is for wholesale, retail, inventory management, or the like. Such tagging may be made with unique identifiers such as Radio-Frequency Identification (RFID) tags, bar codes, or other identification systems readily available or later discovered. Products that are uniquely identified may now be placed in the system of the present invention by use of aspects of near field communication (NFC) or other contactless (CTLS) process tag linked up with a sensor connected with the system. Understandably, the product and tagging of the system may, at different times and conditions not be enabled as part of the communication and monitoring according to the present invention. In such instances, an enabling check may preferably be made to assure that both the product and the enablement of the system are assessed usable according to the embodiment of the present invention.

In the present embodiment, the system preferably includes and provides independent nodes that may be linked together in a master-servant relationship wherein the master is programmed or coded to communicate with elements of the retailer's system. Communication between the independent nodes or the servant and master dependencies may preferably be accomplished by use of low power microcontrollers and an antenna or Bluetooth interphase. When an NFC tagged item is introduced into an area or location, the servants are preferably programmed to connect with the item and the master. It is practical to link many servants to a master in each location in the store or retail enterprise. This connection and loss of connection provide at least a means to monitor the interaction in the store or retail enterprise. According to the present invention, RFID tagged items preferably have unique identifiers with a central control wherein the connection provides particular reference to address the typical challenge of general identification of products in the retail environment.

In an embodiment of the present invention, each area of interest in the retail environment is preferably provided with a communication system that monitors the master-servant relationship of the items that are tagged with RFID. In action, a product having an RFID tag is placed in an area with connectivity; when and if that product is moved and not returned within a set period of time, the system records that movement as a lift. A lift that is longer than desired triggers other pre-programmed or pre-configured activities. A lift example may be as short as 60 seconds or extended, depending on the environment wherein such monitoring is of interest. In some instances, and depending on the intent of the monitoring, the times between lifts or placements may be extended as desired for effective monitoring or better understanding of the relationship between the customer and the product or item on the shelf, rack or location of interest. If there is a disconnect due to the product not being recorded in the system between the tagged product and the system, the need to have such product entered into the system is shown and such update adds the product to the inventory.

Communication between the master, servant and controlling system may, by necessity, be Internet ready. Given the prevalence of Internet protocols on most applications, the communication systems may need to be adaptable to function in the province of Internet-ready applications. It is reasonable to imagine information storage and communication to be Cloud ready or adaptable to function with Cloud programming. Cloud storage and programming allows for the now-known benefits beyond what is available to a server-based system—providing redundancies with given packages that may also be managed from various locations. A broader construct is the "Internet of Things" (IoT) environment wherein communication and interconnectivity of the master and servant application can be properly operable.

According to the present invention, a monitoring system is preferably created to address the interaction between the customer and the product as it pertains to the lifting or placing of a product in a retail environment. When a customer attempts to select a product from the shelf at a store, the customer may, by necessity, either take the product to the checkout process or put it back on the shelf. In some cases, the customer might hold on to the product without buying or paying for it. In other instances, the customer may reshelf the product elsewhere for one reason or another. This interaction is of importance to retailers as there is need to know where a product is or how the interaction transpires between the customer and product or object of interest. The lift-and-reshelf process if not performed as routinized, provides needed information to the retailer about customer reaction or interaction with the products.

When of if the system utilized to monitor is not formalized to obtain the needed information in a retail environment, the system of the present invention provides alerts to sensitize the retailer or control system about the need to have such sensors built into the product cycle. For portable systems, the introduction of power sources to keep both the servant and master systems may include battery packs for each component as against a direct link to a wall or pre-wired power source. It is also reasonable to imagine a system according to the present invention wherein the unauthorized lifting or placement of the product or object of interest may be relatable to a control or management system that may serve to provide inventory integrity and sustainability.

Referring now to FIG. 1, a system 10 of the present invention is initialized 11 and having capacity or programming to monitor and detect product lifts or placement in the location or facility of interest. The initialized step in the present invention includes confirmation of presence or lack of the data collection site; whether at the location of monitoring; on a server wherever that is located on in the Cloud. Said database preferably includes pertinent information about the inventory of interest, including, but not limited to product description, tag identification, or other information that may be useful for the monitoring process. Reasonably, product age and time in residence may be included as needed. In some instances, Universal Product Codes (UPC) may be utilized to provide an efficient means to gain access to the full description of the product or package of interest.

Utilizing the system of the present invention, product placement or lift 100 may be noted via a contactless (CTLS) or near field communication (NFC) process. Each event in the placement, enablement, or lift in the system is preferably recorded in a location of choice. The event 20 is preferably transmitted to a server, cloud or such storage location to maintain the monitoring events according to the present invention.

Where the initial placement is recorded and transmitted in step 20 as a recordation of the product or item that is monitored, an event 30 that may include a lift, replacement, relocation of the item of interest preferably gives way to the next step of updating the state, location or other status 40 of the product or item in the system. It is notable that each of these steps may preferably be located or noted in the repository of information about the product. As this cycle ends 50, the cycle of monitoring of an item according to the present invention continues wherein the next logical step is a reset of the process to provide monitoring of the item or product of interest.

Figure 2:
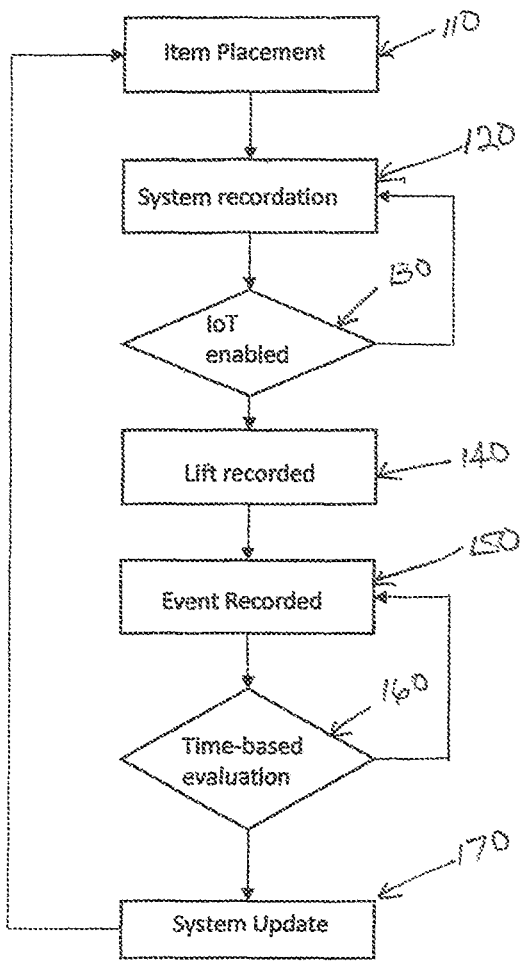
FIG. 2 illustrates a more-detailed flow process for monitoring the interaction of a product according to the present invention.

Now, FIG. 2 refers to a system 100 wherein the item of interest is recorded as recognized in the flow of the monitoring process 110. If UPC or other identifiers of the item is recorded, the system of the present invention may preferably and operably be adapted to assess and maybe, preconfigure said inventory or item in the system 120. A monitoring system according to the present invention may be linked in an Internet of Things (IoT) environment wherein if said recordation or link 130 is not enabled, the system may reinitialize to begin the process at initial placement 110 or system recordation 120. The use of IoT according to the present invention relies on the data or information storage in 130 to adapt to any store or location event. As an object or item is lifted or relocated 140, the system records such shift or replacement according to the setup of the system—locally or in the cloud 150. A time-based lift according to the present invention may preferably be programmed 160 into the process. Depending on the process of the present invention, an update 170 of the system and analyses of the lift, replacement may be transmitted to the repository of information as required for this process.

In use, when a product under monitoring is removed from a preferred location such as a rack, shelf or other predetermined location, the system of the present invention records that removal as a lift in the system when and if the said lift is beyond an expected duration of what is deemed reasonable. That lift, regardless of purpose is information useful for the determination and data collection to document customer interaction with the item. Some product lifts may end when the product is placed in a different location within the retail environment. Other lifts may proceed to the point of sale wherein the sale process addresses the inventory issue for the retail environment and may be useful for restocking or other inventory management processes.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed:
1. A method for item monitoring, the method comprising:
   configuring a master-servant controller for communication with a database of items, the database of items including placement locations of the items;

detecting a first placement location of a near field communication (NFC)-enabled item in a first area of a retail environment, via a first sensor located in the first area of the retail environment linking with the NFC-enabled item, wherein the first sensor is in communication with the master-servant controller and the NFC-enabled item is tagged with a unique identifier;

recording the first placement location of the NFC-enabled item into the database according to the unique identifier;

monitoring, by the master-servant controller, the NFC-enabled item for customer lift;

detecting a customer lift of the NFC-enabled item in response to the first sensor failing to link with the NFC-enabled item for a set period of time;

recording the customer lift of the NFC-enabled item into the database;

subsequent to detecting and recording the customer lift, detecting a second placement location of the NFC-enabled item in a second area of the retail environment, via a second sensor located in the second area of the retail environment linking with the NFC-enabled item, wherein the second sensor is in communication with the master-servant controller; and recording the second placement location of the NFC-enabled item in the database as a relocation event of the NFC-enabled item, according to the unique identifier.

2. The method of claim 1, wherein the database includes at least one of product identifiers, tags or Universal Product Codes.

3. The method of claim 1, wherein the database is maintained in at least one of onsite of the retail environment, in a cloud storage implementation, or in a remote server.

4. The method of claim 1, wherein the NFC-enabled item is tagged with the unique identifier via a Contactless processes including at least one of NFC and Radio Frequency Identification (RFID).

5. The method of claim 1, wherein the NFC-enabled item is configured to use Radio Frequency Identification (RFID).

6. The method of claim 1, wherein the set period of time is at least 60 seconds.

7. The method of claim 1, further comprising detecting that the NFC-enabled item has been returned to the first location.

8. The method of claim 1, further comprising monitoring an integrity of the NFC-enabled item in response to detecting the customer lift.

9. The method of claim 1, further comprising alerting a point of sale regarding the integrity of the customer-item relationship in response to detecting the customer lift.

10. The method of claim 1, wherein the database includes information operably useful to discern customers actions in the retail environment.

11. The method of claim 1, wherein the monitoring of the NFC-enabled item utilizes Internet of Things communications.

12. The method of claim 1, wherein the master-servant controller is a low power microcontroller.

13. The method of claim 12, wherein the master-servant controller is configured to communicate with multiple sensors including the first sensor and the second sensor, and each of the multiple sensors is configured to link with an item having a unique identifier via NFC or RFID.

14. A system for item monitoring, the system comprising:
a controller configured to communicate with a database of items, the database of items including placement locations of the items;
multiple sensors in communication with the controller, wherein the multiple sensors include a first sensor located in a first area of the retail environment and a second sensor located in the second area of the retail environment; and
a near field communication (NFC)-enabled or radio frequency identification (RFID)-enabled item tagged with a unique identifier, wherein the controller is configured to
detect a first placement location of the item in the first area of a retail environment, in response to the first sensor linking with the item,
record the first placement location of the item into the database according to the unique identifier,
monitor the item for customer lift,
detect a customer lift of the item in response to the first sensor failing to link with the item for a set period of time,
record the customer lift of the item into the database;
subsequent to detecting and recording the customer lift, detect a second placement location of the item in a second area of the retail environment, in response to the second sensor linking with the item, and
record the second placement location of the item in the database as a relocation event of the item, according to the unique identifier.

* * * * *